(12) United States Patent
Pangrazio et al.

(10) Patent No.: US 12,474,159 B2
(45) Date of Patent: Nov. 18, 2025

(54) MOBILE PLATFORM INTELLIGENT DECKING

(71) Applicant: Innovative Logistics, LLC, Fort Smith, AR (US)

(72) Inventors: Robert Thomas Pangrazio, Van Buren, AR (US); Jefferson Maldonado, Fort Smith, AR (US)

(73) Assignee: INNOVATIVE LOGISTICS, LLC, Fort Smith, AR (US)

( * ) Notice: Subject to any disclaimer, the term of this patent is extended or adjusted under 35 U.S.C. 154(b) by 771 days.

(21) Appl. No.: 17/825,640

(22) Filed: May 26, 2022

(65) Prior Publication Data

US 2022/0381553 A1 Dec. 1, 2022

Related U.S. Application Data

(60) Provisional application No. 63/193,346, filed on May 26, 2021.

(51) Int. Cl.
*B65G 69/00* (2006.01)
*G01B 11/02* (2006.01)

(52) U.S. Cl.
CPC .............. *G01B 11/02* (2013.01); *B65G 69/00* (2013.01)

(58) Field of Classification Search
CPC ...... G06F 11/3688; G06F 9/54; G06F 11/302; G06F 11/3684; G06F 11/3692; B62B 3/002; B65D 19/003; B65D 19/42; B65D 88/12; B65D 88/129; B65D 2519/00273; B65D 2519/00781; B65D 2519/00786; G01B 11/02; G01B 11/245; G01B 11/00; B65G 69/00

See application file for complete search history.

(56) References Cited

U.S. PATENT DOCUMENTS 5,699,161 A * 12/1997 Woodworth ........... G01B 11/00
  356/628
6,137,577 A * 10/2000 Woodworth ........... G01B 11/00
  356/628

(Continued)

FOREIGN PATENT DOCUMENTS

JP       H08-337390 A    12/1996
KR       101324275 B1    11/2013

(Continued)

OTHER PUBLICATIONS

International Search Report and Written Opinion mailed Sep. 15, 2022, from International Application No. PCT/US2022/031082, 9 sheets.

*Primary Examiner* — Yaritza Guadalupe-Mccall
(74) *Attorney, Agent, or Firm* — Katten Muchin; ROSENMAN LLP

(57) ABSTRACT

Disclosed herein is a dimensioner table (DT) that is highly transportable and can be removably or permanently affixed to a mobile platform (MP). This allows freight to be scanned at the time of pickup or each time it is unloaded/loaded onto a new MP. The dimensioning information collected from the DT can be used to create a 3D model of the freight which can be used to help provide loading instructions. The successive scans of the freight by each DT can also be used to identify any discrepancies in the 3D models or captured images which may indicate damage or partial loss of freight.

11 Claims, 11 Drawing Sheets

(56) References Cited

U.S. PATENT DOCUMENTS

| | | | | |
|---|---|---|---|---|
| 10,124,927 B2* | 11/2018 | Bradley | ............... | B65D 19/003 |
| 10,563,971 B2* | 2/2020 | Van Horn | ............... | G01B 11/02 |
| 10,655,945 B2* | 5/2020 | Nanda | .................... | G05B 15/02 |
| 10,935,367 B2* | 3/2021 | Van Horn | ................. | G06T 7/85 |
| 11,605,177 B2* | 3/2023 | Carey | ................ | G06F 3/04845 |
| 2015/0009338 A1* | 1/2015 | Laffargue | ............ | H04N 17/002 |
| | | | | 348/175 |
| 2016/0109219 A1* | 4/2016 | Ackley | ................ | G01B 11/022 |
| | | | | 348/136 |
| 2016/0370220 A1* | 12/2016 | Ackley | ............... | G01F 25/0084 |
| 2017/0280125 A1 | 9/2017 | Brown et al. | | |
| 2019/0025852 A1* | 1/2019 | Nanda | .................... | G05B 15/02 |
| 2022/0381553 A1* | 12/2022 | Pangrazio | ............... | G01B 11/02 |

FOREIGN PATENT DOCUMENTS

| | | | |
|---|---|---|---|
| KR | 101830584 B1 * | 2/2018 | |
| KR | 20180123242 A * | 11/2018 | |

* cited by examiner

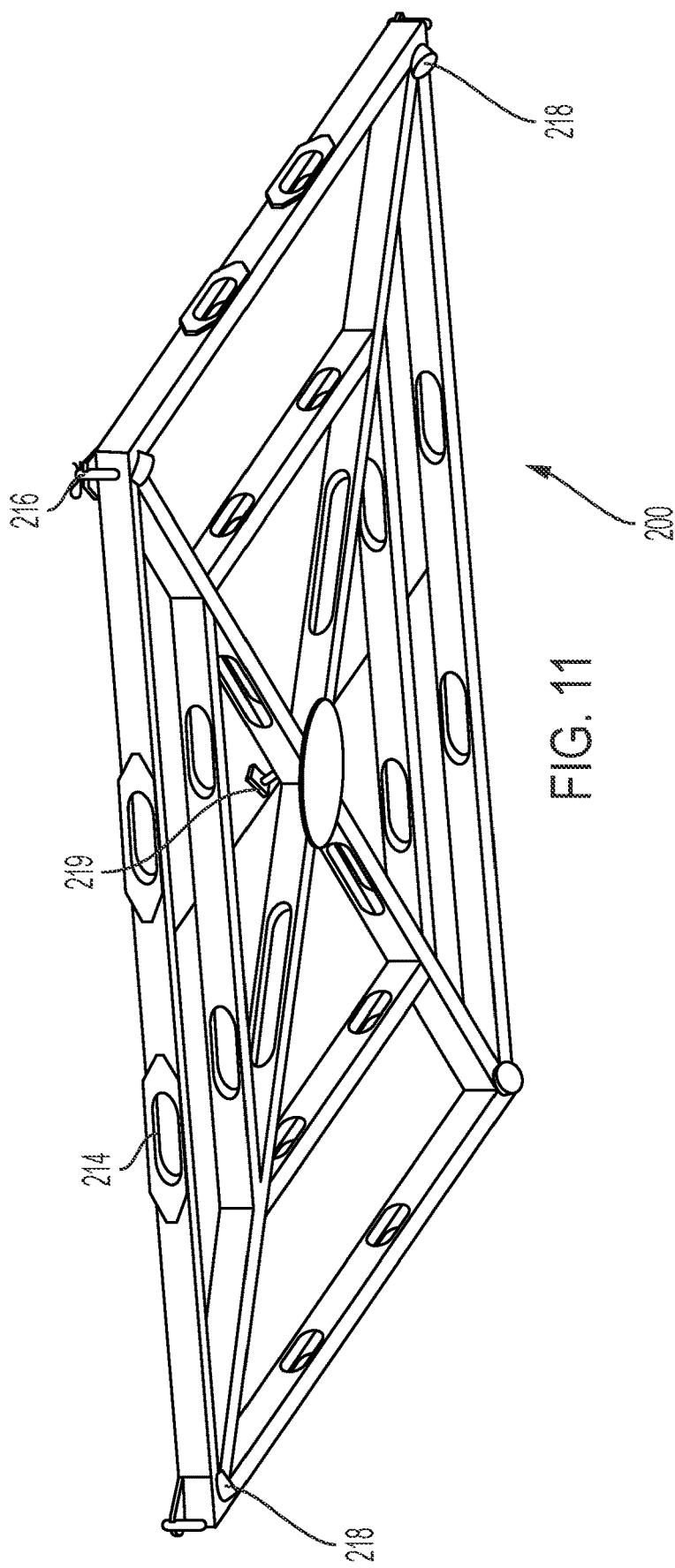

MOBILE PLATFORM INTELLIGENT DECKING

CROSS-REFERENCE TO RELATED APPLICATIONS

This application claims priority to U.S. Provisional Application Ser. No. 63/193,346, filed May 26, 2021, the entire contents of which are hereby incorporated by reference in their entirety.

BACKGROUND

In LTL shipping, there are many inefficiencies due to the nature of the model in which freight from multiple shippers is combined and processed through a hub and spoke network to a final destination. A main inefficiency results from inaccurate freight dimensions that causes operational issues throughout the entire shipment process.

Planned delivery loads based on inaccurate information require rework on the dock and cause a sub-optimal delivery schedule, requiring more routes and drivers. Inaccurate dimensions requires the software to plan for underutilized loads. As such, loads often require an unneeded consolidation step to create full loads (three MPs being consolidated to two). Furthermore, inaccurate dimensions also result in planned loads that that do not fit on an MP (or trailer), requiring in a change load process that results in higher handles per piece.

This dimension uncertainty limits the ability to have a dynamic dock operation since static load points are needed to mitigate the negative impact of change loads, causing higher travel distance. A rework from light or heavy loads results in piece location inaccuracy when pieces are moved on the MP, but not scanned. This causes increased search time and higher minutes/piece move.

The lack of dimensional data inhibits the ability to create a bin stacking algorithm to optimally plan how to "Tetris" the freight into the load. This causes extra schedules to be run and the associated expense. Inaccurate dimension data may also lead to under-dimensioning, leading to lower revenue from inaccurate pricing.

Accordingly, there exists a need for obtaining accurate dimension information for freight, preferably at the point of pickup. Piece dimensions accuracy is essential for autonomous solutions. A bin stacking algorithm that informs where the freight needs to be placed on the MP is a critical enabler for autonomous loading. In addition, freight dimensions are critical inputs to the obstacle avoidance systems that ensure the freight is not damaged via environmental collisions.

SUMMARY

Disclosed herein is a dimensioner table (DT) that is highly transportable and can be removably or permanently affixed to a mobile platform (MP). This allows freight to be scanned at the time of pickup or each time it is unloaded/loaded onto a new MP. The dimensioning information collected from the DT can be used to create a 3D model of the freight which can be used to help provide loading instructions. The successive scans of the freight by each DT can also be used to identify any discrepancies in the 3D models or captured images which may indicate damage or partial loss of freight.

BRIEF DESCRIPTION OF THE DRAWINGS

FIG. 11 depicts a view of an underside of an embodiment of the DT showing placement of the cameras.

DETAILED DESCRIPTION

Figure 1:
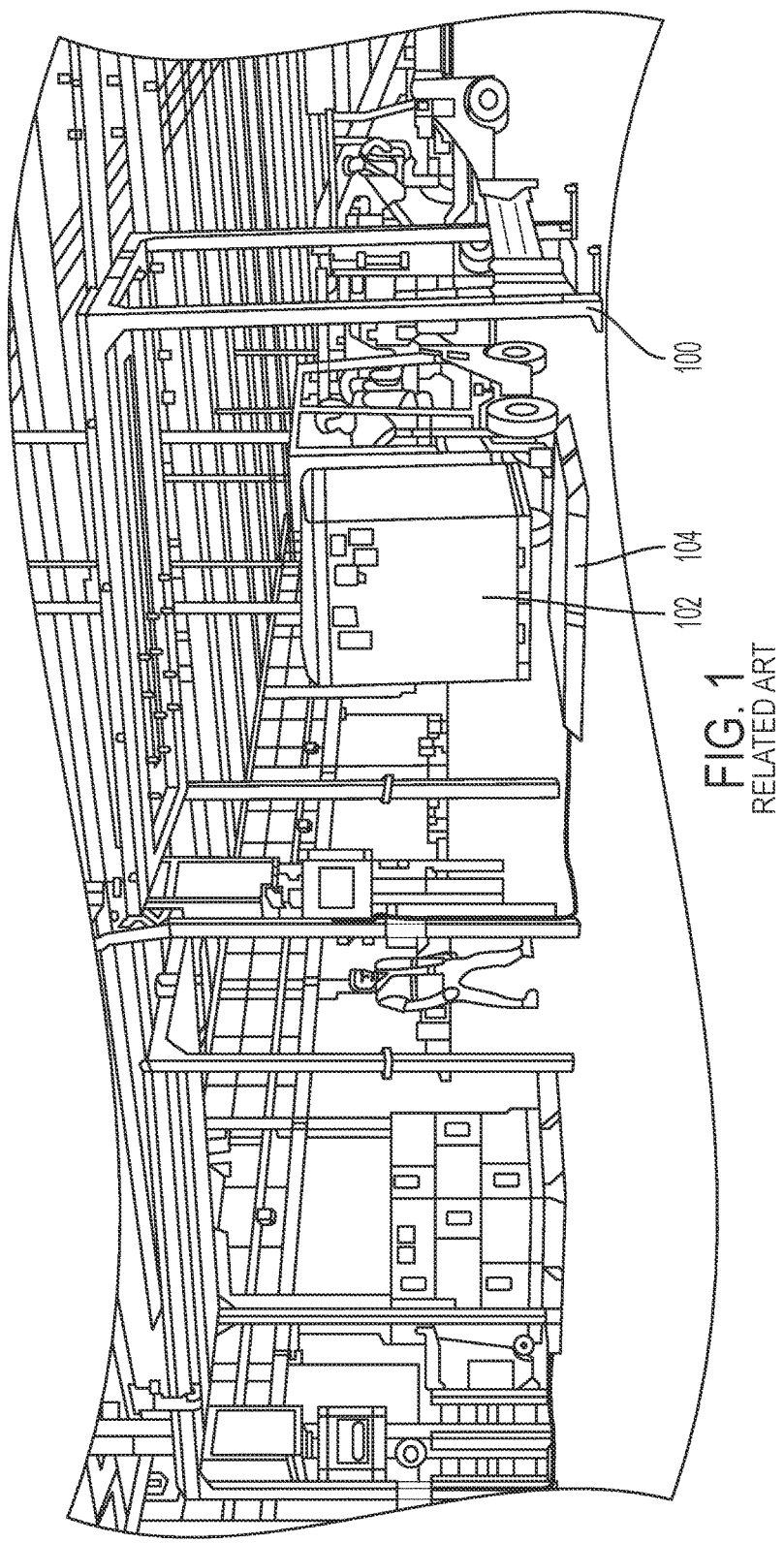
FIG. 1 depicts a common dimensioner utilized in a warehouse.

Current market solutions include hand held scanners and centralized dock systems. They are either inaccurate, expensive, or require wasteful process changes to measure the freight. Furthermore, installation of current solutions preclude measurement at pickup. An example of a standard dimensioner 100 is depicted in FIG. 1. The dimensioner 100 typically requires placing the freight 102 within the confines of the dimensioner 100 on a cross-dock. A plurality of sensors (cameras, LIDAR, RFID, etc.) capture multiple views of the freight 102 so that a 3D model with dimensions can be calculated. A scale 104 can be placed on the floor of the dimensioner to capture the weight of the freight 102. As shown, the dimensioner 100 can take up valuable floor space on the dock and requires all freight 102 to be moved to a single location under the dimensioner 100, increasing the number of moves made by automated or manual vehicles.

To address this problem, the present invention utilizes a dimensioner table (DT) 200 which can be positioned on any four posts 204 of a mobile platform 202, or even installed in the roof of a trailer at the entrance. A mobile platform (MP) 206 is a platform that spans the entire/bed of a trailer 204 that can be used to load/unload a trailer in a single move. DT 200 preferably is square or rectangular in shape and comprises four perimeter beams 208. A pair of cross beams 210 may be added to DT 200 for stability. A second, smaller set of beams 212 can be arranged in a square or rectangular shape using the cross beams 210 for support. Beams 212 may be used to support additional sensors for DT 200.

Each perimeter beam 208 and beam 212 preferably comprises openings 214 which are arranged to form cross channels across the length and width of DT 200. The openings 214 preferably have a width and height greater than that of standard forklift tines so that the forklift tines can be placed through either cross channel for positioning of the DT 200 on posts 204.

The outer corners of DT 200 preferably comprise a coupling having a pin 216 for insertion into top of posts 204 or into slots on the sides of posts 204. Each coupling 216 may also comprise a locking mechanism for securely fixing DT 200 to MP 206 during transport. In some embodiments, a permanent connection, such as welding, may be utilized to secure DT 200 to posts 204. Systems and methods for coupling a deck with couplings 216 to posts 204 are disclosed in U.S. Pat. No. 10,279,955, the entire contents of which are hereby incorporated by reference in their entirety A plurality of sensors, such as depth sensors or cameras 218 are positioned on DT 200. Preferably, a camera 218 is positioned at each corner of the DT 200 on outer beams 208 or cross beams 210. The cameras 218 are preferably angled such that they point towards a center point of the bottom of posts 204 on which DT 200 is mounted as depicted in FIG. 11. The exact angle of each camera 218 is determined by the height of posts 204 and the spacing between posts 204. The cameras 218 may be built directly into openings in the DT 200 or attached to the frame via other means such as welding, clamps, adhesive, etc.

An angle of view on each camera 218 is preferably wide enough to capture taller freight that almost touches DT 200. For example, fish eye cameras or wide angle lenses may be utilized and the captured images can later be corrected using known techniques.

DT 200 may also comprise one or more other sensors, such as LIDAR or infrared sensors which can be used to create a depth map for mapping the freight 102. The information from these sensors can be utilized to create a 3D depth map of the freight 102 which can be used in conjunction with the depth and image data gathered from cameras 218.

Some MPs 206 may comprise a scale installed in the decking directly under a center of DT 200. The weight information gathered from the scale can be stored in combination with other information gathered about freight 102. DT 200 may also comprise a GPS device for tracking or reporting a current location of DT 200.

DT 200 also comprises one or more wireless communication units 219 for transmitting the collected information over cellular, Wi-Fi, satellite, etc. The wireless communication units can also be utilized to periodically report a location of the DT 200 during shipping.

All of the electronics on DT 200 are powered by a portable power source such as a rechargeable or replaceable batter affixed to DT 200. Alternatively, DT 200 may comprise a connector for coupling DT 200 directly to an external power source such as that of the trailer in which DT 200 is placed. The wireless communication units may be used to communicate a current battery life of the power source, making it easier to replace or recharge the power source as needed by trailer or cross-dock personnel.

In some embodiments, DT 200 further comprises programming to automatically detect the addition and removal of freight 102. The cameras 218, for example, may constantly monitor a center of DT 200 and not collect dimension information until certain conditions are met. Generally, the conditions include a) detection of freight 102 of some kind, b) detection of tag 220, and c) detection of no movement of freight 102 for a predetermined period of time. DT 200 would only collect dimension information if all conditions are met because it indicates that freight 102 has been positioned and is no longer in transit.

This monitoring may also be accomplished by a secondary lower power sensor or camera used to detect the presence of new freight 102. If the secondary system detects new freight, it activates all other sensors (e.g., cameras 218, GPS, etc.) to collect data. This can be used to extend the battery life of DT 200 by only activating the more power intensive sensors when needed. Alternatively, the collection of data by DT 200 may be manually actuated by onsite personnel, such as a forklift driver or cross dock manager.

At pickup, each piece of freight 102 is preferably assigned a unique ID and a tag 220 is affixed to freight 102 on a visible surface. The tag 220 may be a machine readable code which encodes the unique ID related to the freight 102. Alternatively, the unique ID can be coded into an RFID tag that is placed on the freight 102. Systems and methods for assigning IDs to freight 102 at pickup and tracking freight from pickup to delivery are discussed in U.S. Pat. No. 10,147,059, the entire contents of which are hereby incorporated by reference in their entirety.

Figure 2:
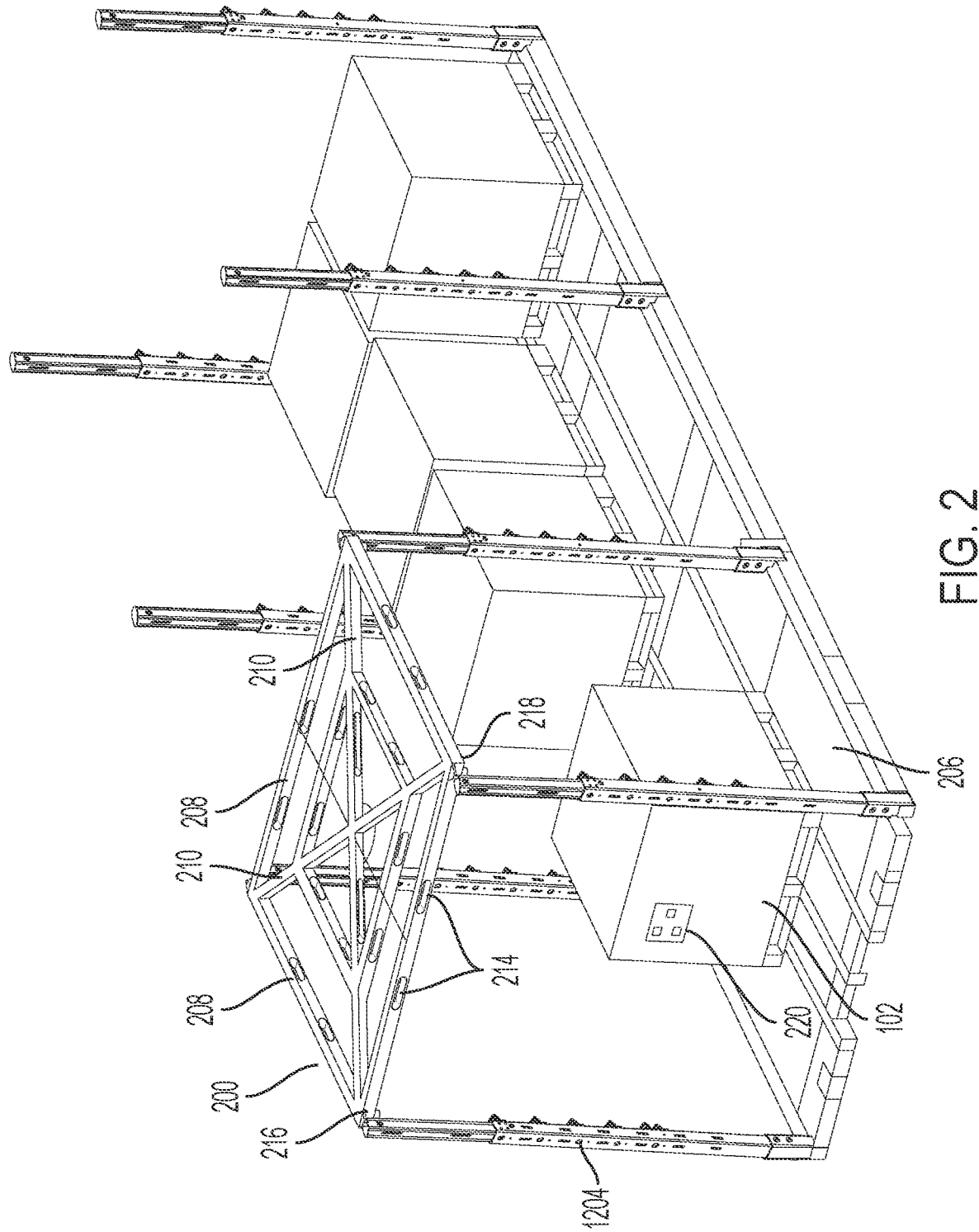
FIG. 2 depicts a perspective view of a dimensioner table positioned over cargo on a mobile platform (MP).

When the freight is initially placed under DT 200 as shown in FIG. 2, the cameras 218 capture images of freight 102 which includes tag 220. Using known techniques, the tag 220 can be identified in the images. After the unique ID has been identified, the information collected by DT 200 is preferably stored in connection with the unique ID along with a time stamp or location in a centralized database. This allows freight 102 to be tracked throughout the entire shipping process because images and dimension data are collected each time it is loaded onto a new MP 206 during shipping.

Figure 3:
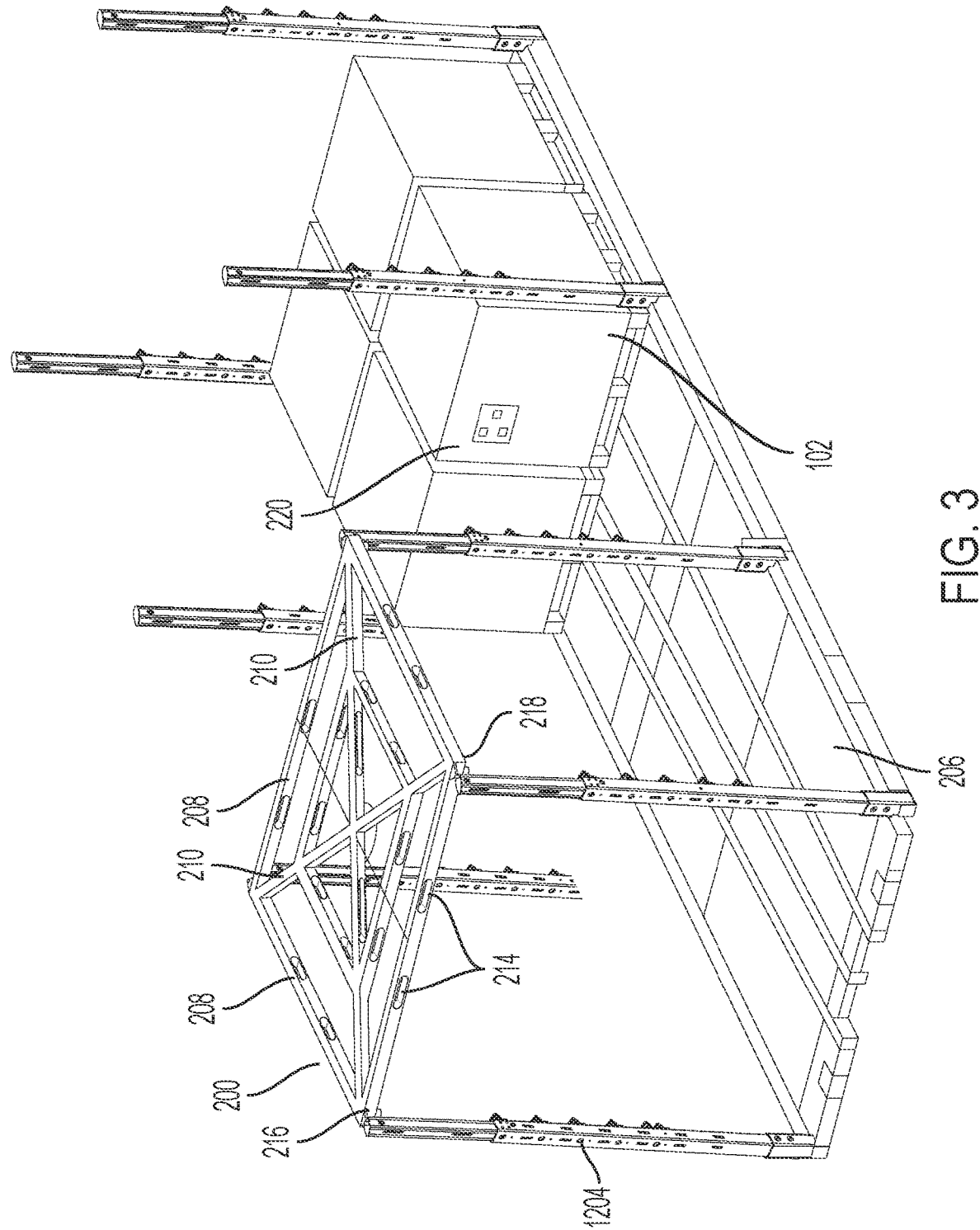
FIG. 3 depicts the view of FIG. 2 with the cargo moved to a rear of the MP after dimensioning.
Figure 4:
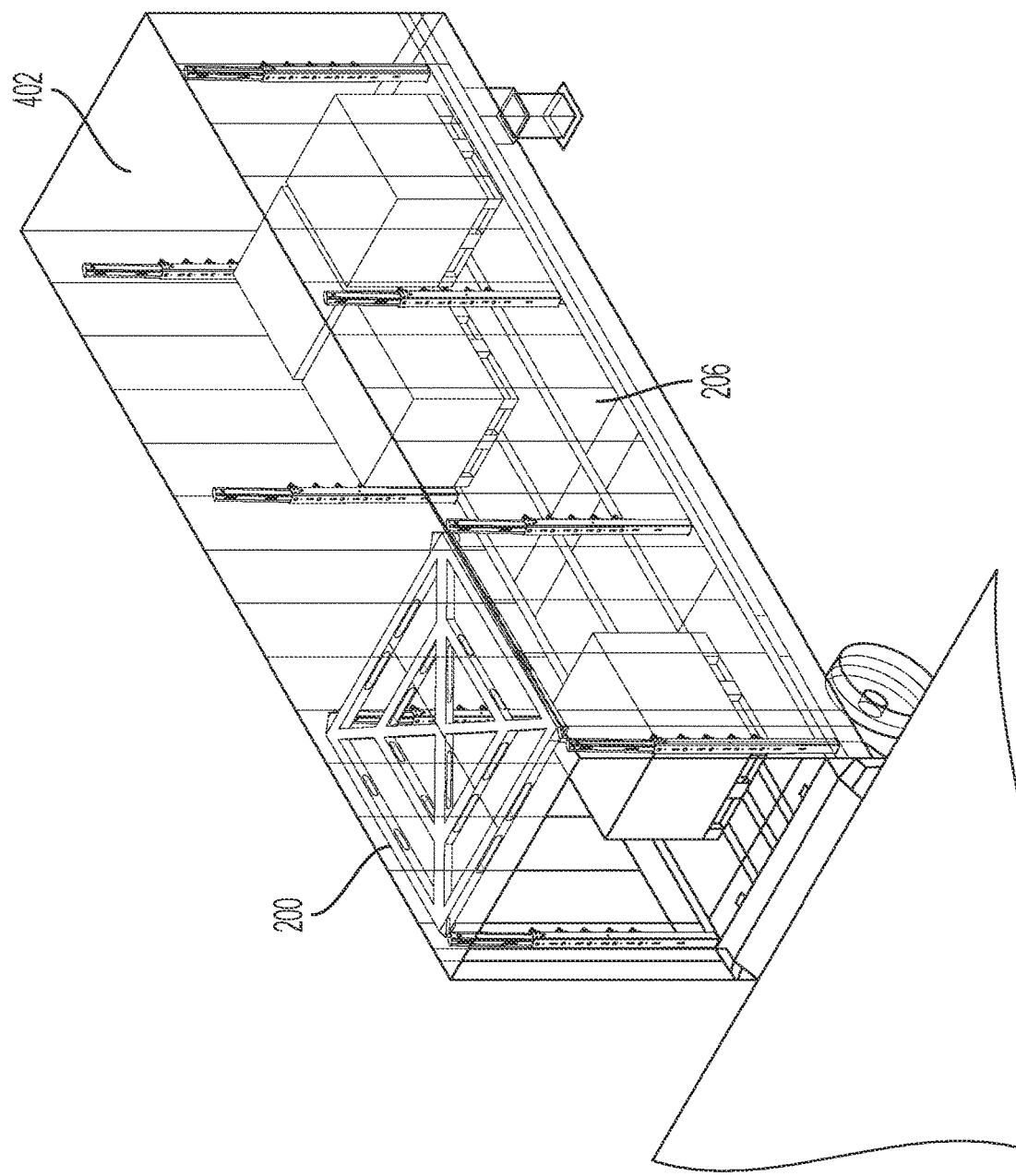
FIG. 4 depicts a view of the MP in a mobile platform placed in a trailer for dimensioning cargo.
Figure 5:
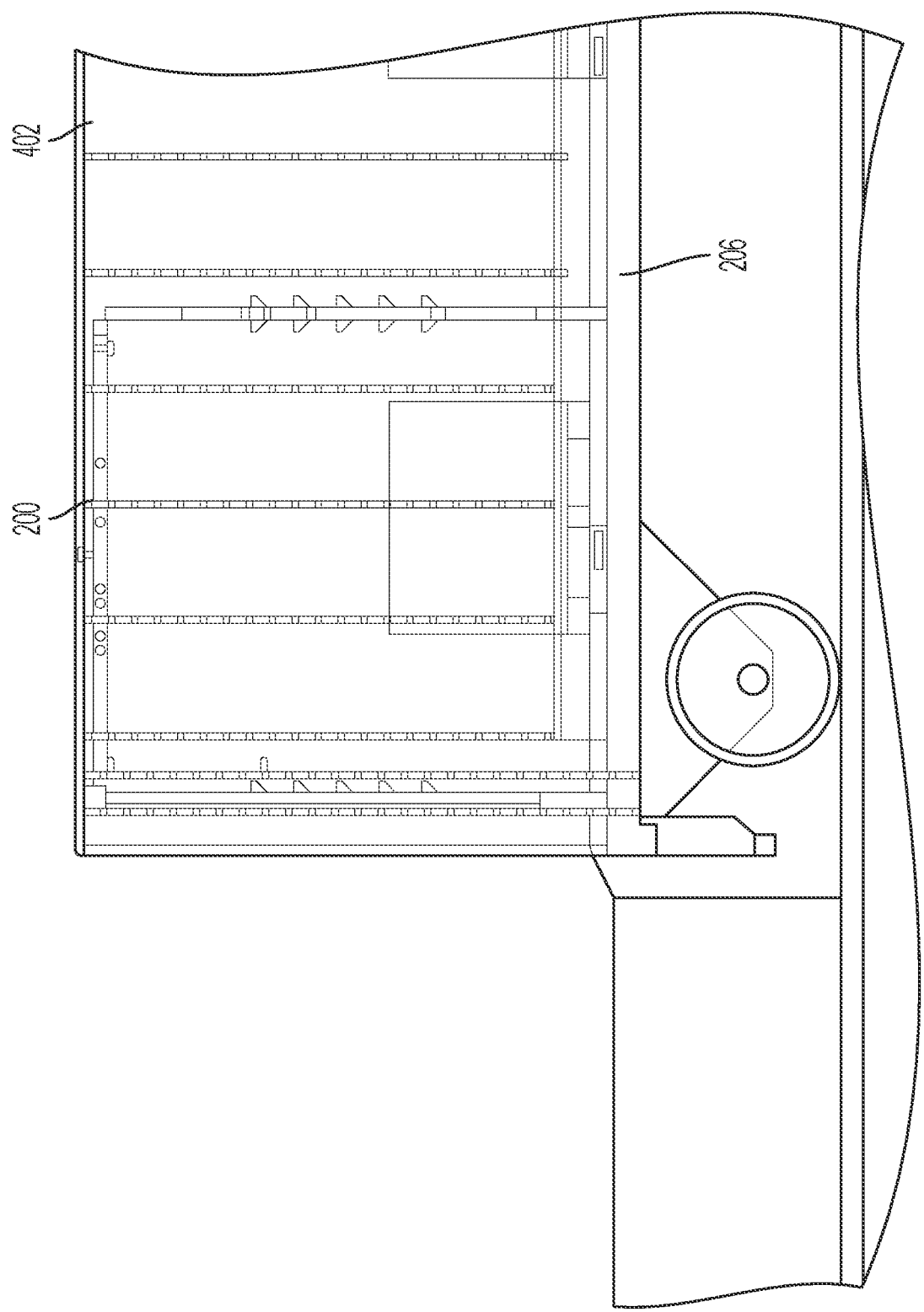
FIG. 5 depicts a side view of FIG. 4.

After freight 102 has been scanned, it is moved to the back/front of MP 206 so that new freight 102 can be scanned as shown in FIG. 3. FIG. 4 depicts MP 206 placed within a trailer 402 (shown in phantom). In this view, the trailer 402 has been positioned at a cross-dock bay for loading/unloading. As trailer 402 is being loaded, the freight 102 does not need to be brought to a separate or dedicated dimensioner 100 as shown in FIG. 1. This decreases carry time and empty carries for each piece of freight 102. Instead, the collection of dimensioning information can be accomplished as each piece of freight 102 is loaded, requiring only a short pause under DT 200 as shown in FIG. 5 for the collection of the dimensioning information by DT 200. The freight 102 can then be properly loaded as shown in FIG. 6 and a new piece of freight 102 can be loaded directly thereafter.

Figure 7:
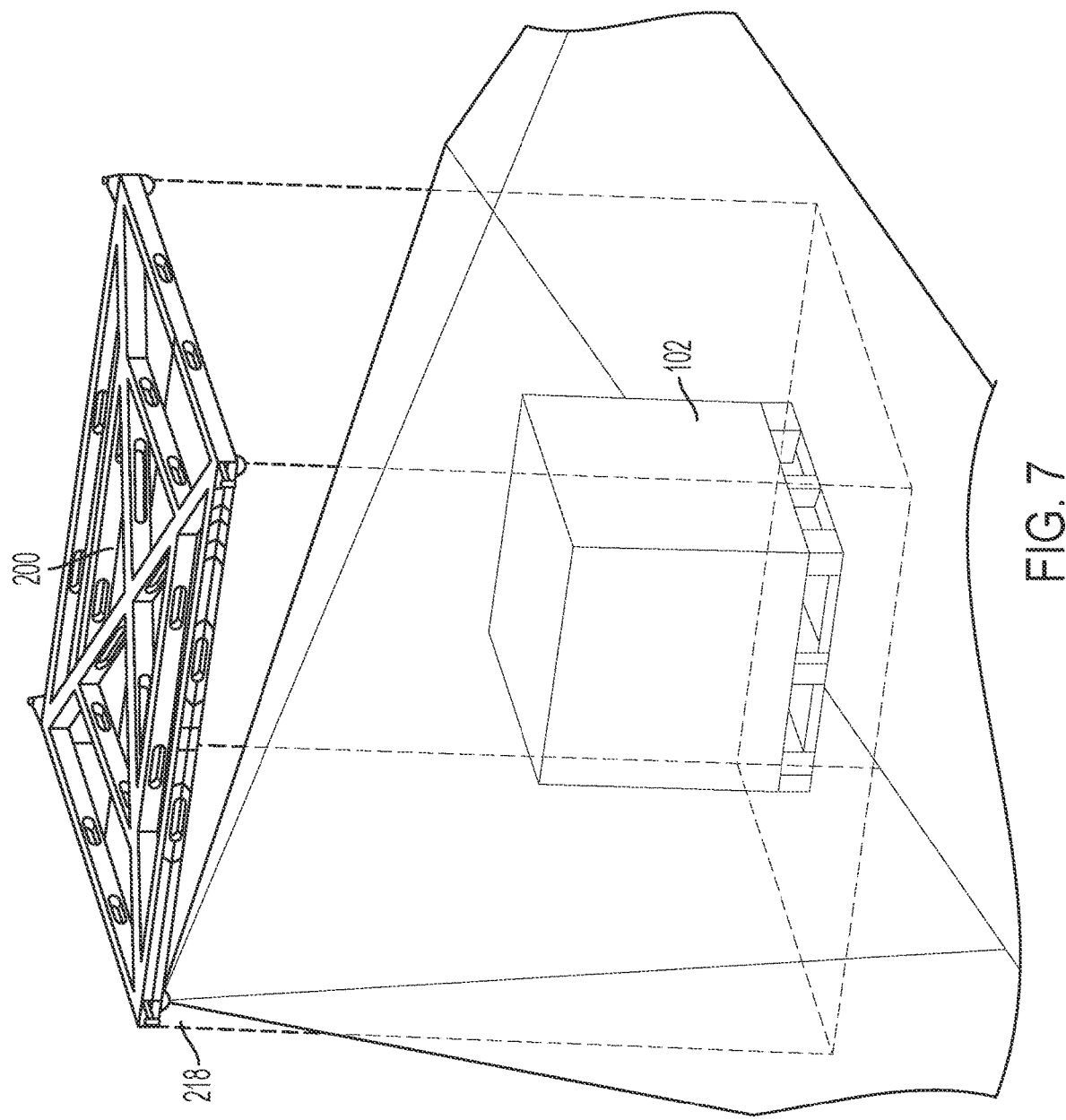
FIG. 7 depicts the capture range of a single sensor placed in a corner of the dimensioner table.
Figure 8:
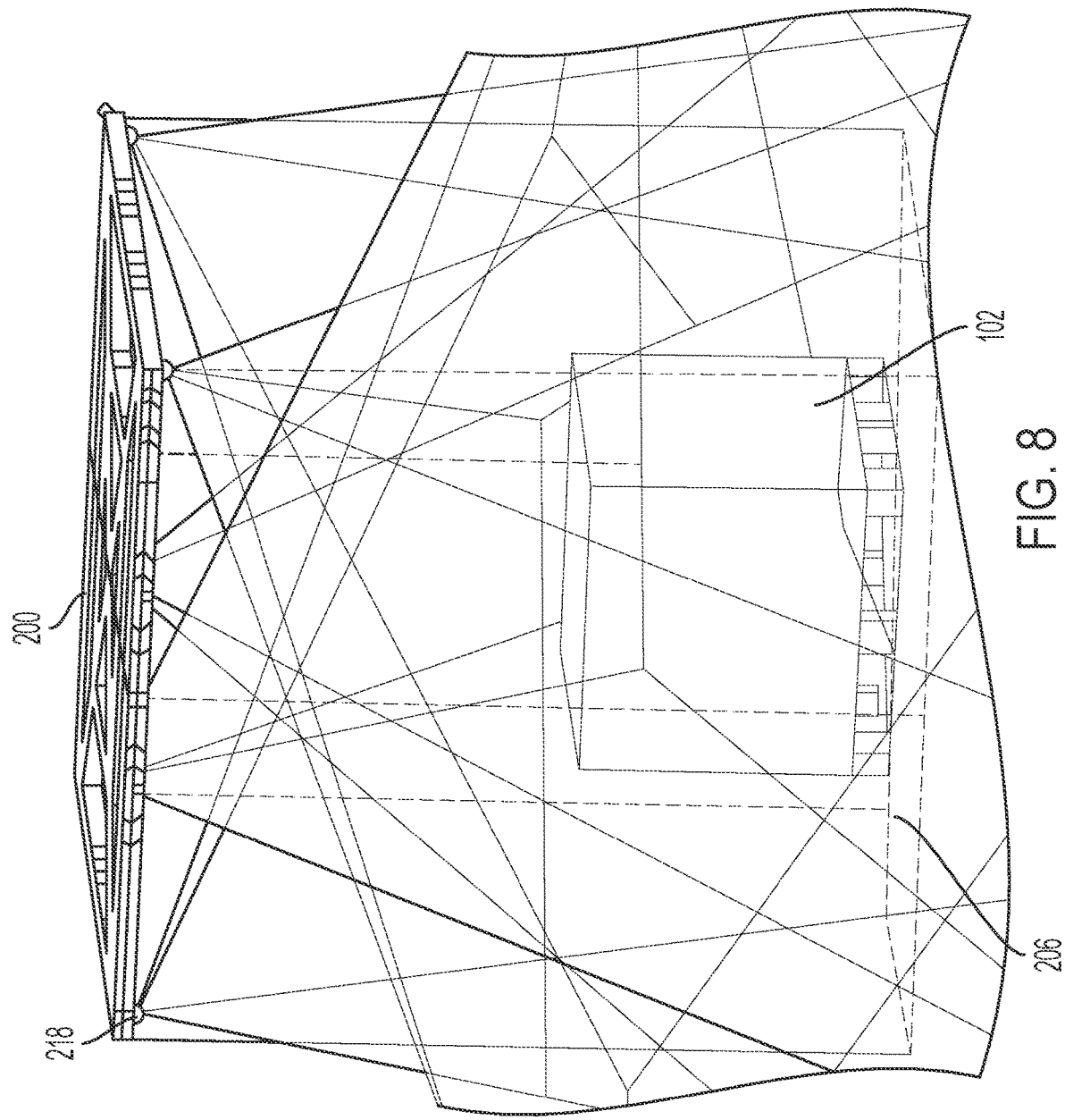
FIG. 8 depicts the capture range of all sensors of the dimensioner table.

FIG. 7 shows the angle of view of a single camera 218. As shown, even a single camera 218 is able to capture images of three sides of freight 112. When four cameras 218 are utilized, as depicted in FIG. 8, the capture envelope spans almost the entire volume of space contained within the area bounded by MP 106, posts 204, and DT 200.

Figure 6:
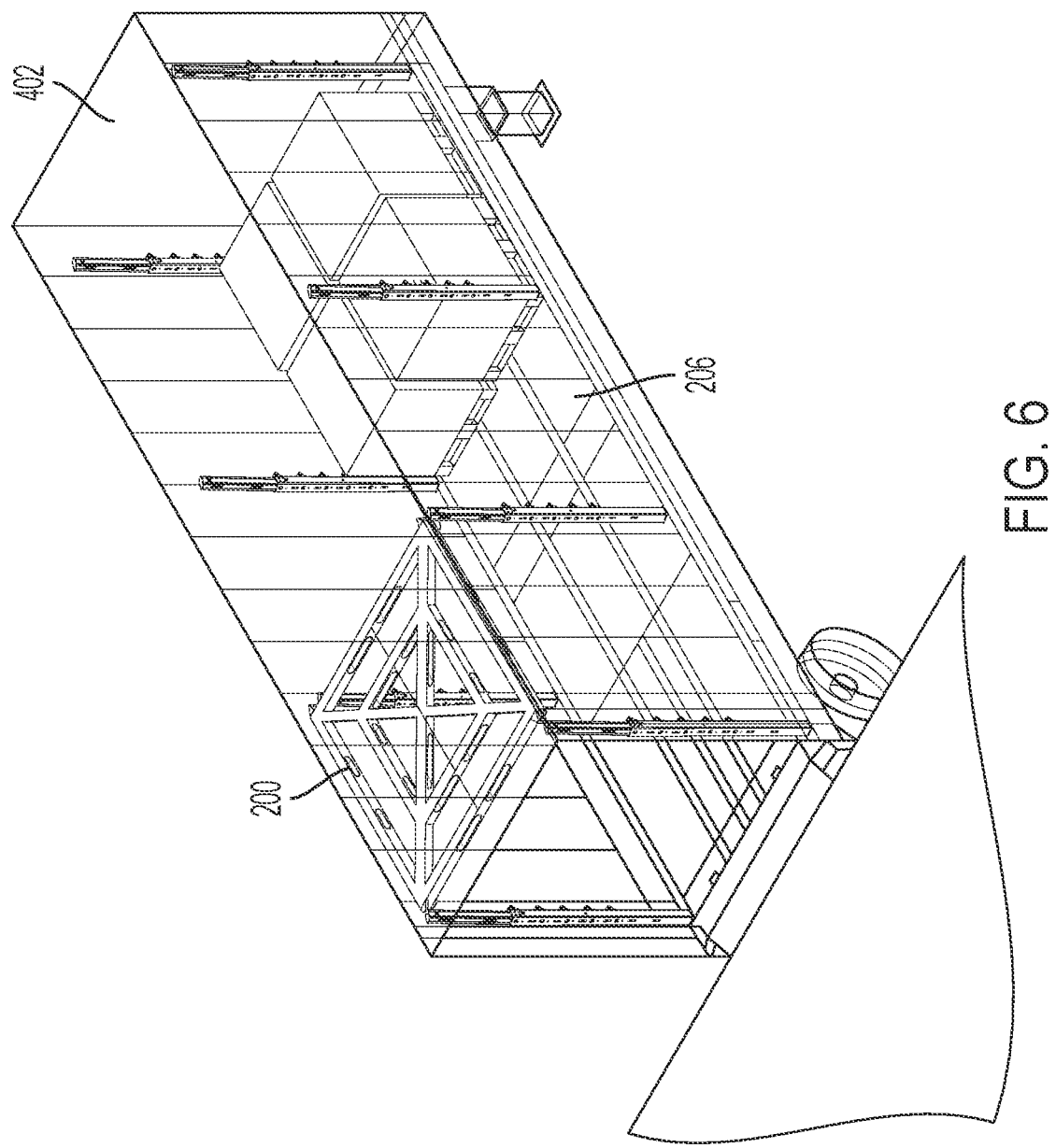
FIG. 6 depicts the view of FIG. 4 with the cargo moved to a front of the trailer.

FIGS. 6 and 7 depict a 3D model of freight 102 after data is captured by dimensioner table 206. Further, the cameras 210 can be used to identify any tags on freight 102 such as barcodes, text, or other identifiers. If damage is detected, images of the damage to freight 102 can be saved in conjunction with the 3D model and dimensions as shown in FIG. 7.

DT 200 provides several advantages over other dimensioner 100 in that it is low cost, all data is collected at the customer pickup point (3D, Imaged, Barcodes etc.) resulting in: Dimensions, Identification, Classification. This also allows freight 102 to be classified early in the process which affects how the freight is handled and monitored: Standard vs Awkward to handle freight, Barrels/Drums/Boxes, pallet access points, damaged at pickup, etc.

DT 200 also enables freight 102 to be automatically scanned at the pickup point instead of at the warehouse. This allows any damage to be identified early and helps to provide pickup to drop-off collection of data. As the trailer 402 moves about to collect shipments, each piece of freight 102 is loaded under the DT 206 as depicted in FIG. 1. The cameras 218 take various images from multiple angles of the freight 102, and computer vision algorithms capture the piece level dimensions, identify unique piece identifiers, and detect damage. The freight 102 is then placed in the nose of the trailer 402 as depicted in FIG. 6 and the next piece of freight 102 can be dimensioned at the next pickup point.

As the freight 102 is acquired, the dimension information, and any other sensor information collected by DT 200, can automatically be transmitted back to a central location by the wireless communication units. When the loaded trailer 402 arrives at a dock for unloading and processing, the dimensions of all the freight 102 thereon is already known and the system can determine in advance how the freight 102 should be unloaded (e.g., to a different MP 206), greatly increasing the efficiency of unloading because there is no guesswork.

DT 200 leverages the MP design in order to reduce cost. This is done by leveraging the existing infrastructure such as the posts 204 and decking mounting system of the MP 206. The known geometry of the MP 206 allows for a known detection envelope that reduces software complexity and helps increases system efficiency.

The locations of cameras 218, or other sensors, can be arranged in a manner that reduces blind sports in the detection area. Data from DT 200 can be configured to be processed by local computing, edge computing, or cloud computing. For example, the dimensions can be calculated by a device installed on trailer 402 or the data can be uploaded to the cloud for processing.

When DT 200 is no longer needed in trailer 402, it can be removed from posts 204 and replaced by a deck for stacking freight. This way, the same DT 200 can be utilized by multiple trailers 204. Or, in some embodiments, the DT 200 is always installed on the same MP 206 which is then used for picking up freight 102. This is doable because the MP 206 can easily be loaded/unloaded from a trailer 402 in a single move. DT 206 can also be mounted on a fixed area inside a warehouse if needed or affixed to a ceiling of trailer 402.

Figure 9:
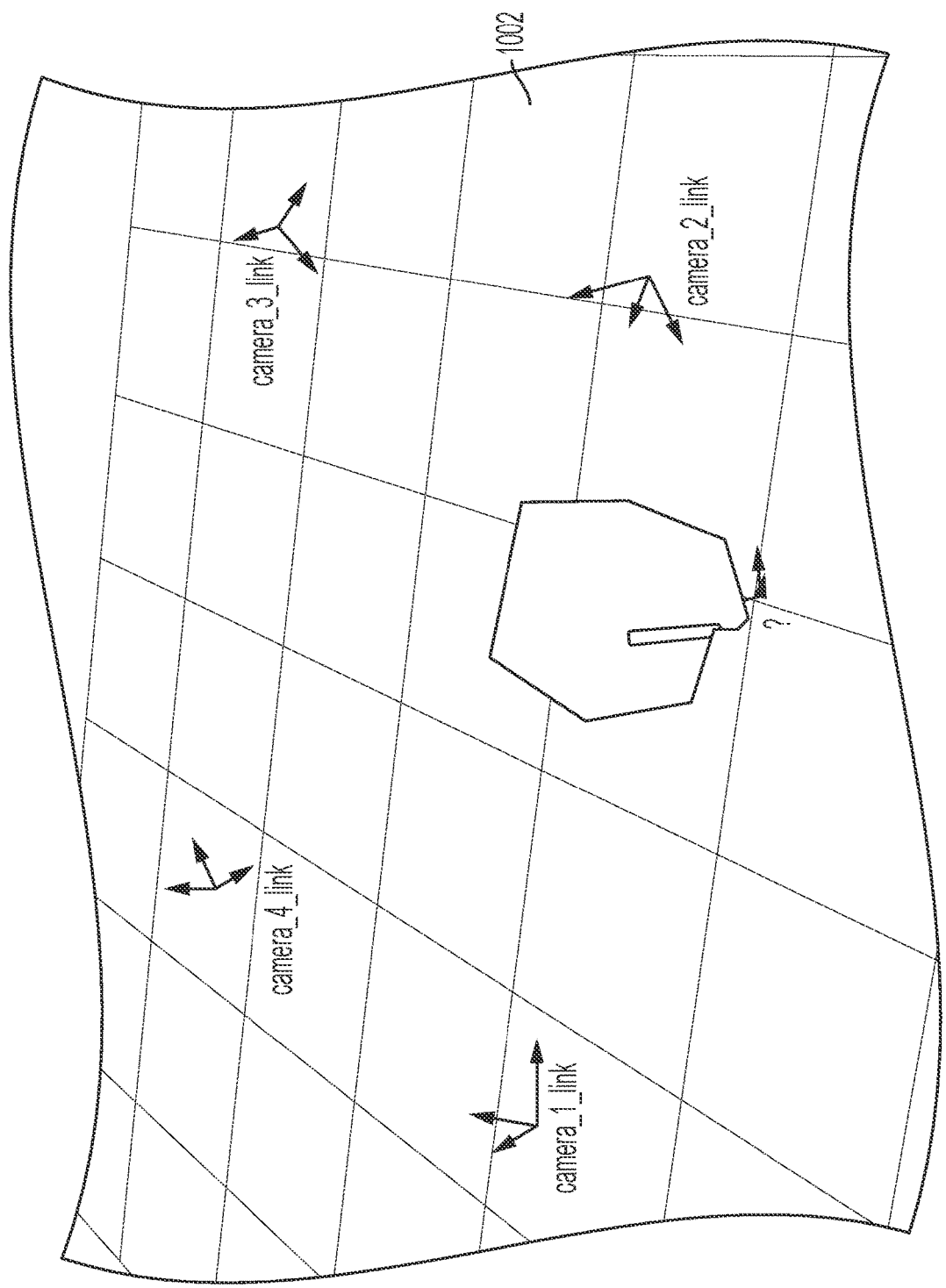
FIG. 9 depicts a computer rendering of the cargo from data collected by the dimensioner table.

FIG. 9 depicts a sample 3D model of freight 102 that is stored in association with the unique ID of freight 102 in the centralized database. The 3D model is created from the images from camera 218 and/or depth sensors on MP 206. Because a full 3D model of the freight 102, this can greatly help in positioning of freight 102 within the trailer because more than just the length/width/height is known. For example, the 3D model information can be used by a packing algorithm (e.g., Tetris algorithm) to better provide instructions for packing a trailer 402 than if only the envelope parameters (length, width, height) of freight 102 are known.

Figure 10:
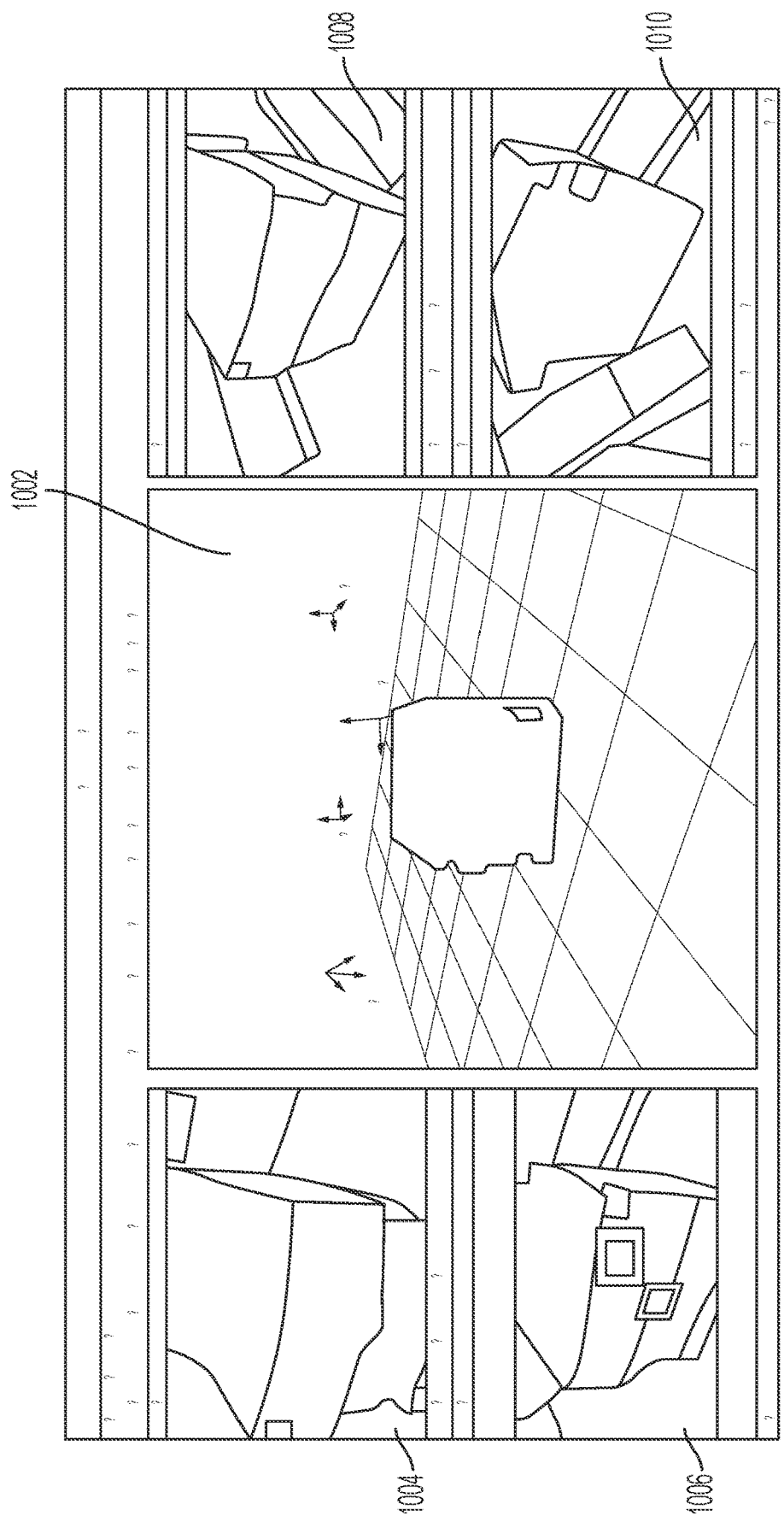
FIG. 10 depicts a display view showing the computer rendering in association with image of the cargo capture by the dimensioner table.

FIG. 10 depicts a sample UI 100 in which a set of dimensioning information is viewed by a user. The center 1002 of the UI shows the 3D model and the four corner images 1004-1010 show the four camera images that were used to construct the 3D model. Since the freight 102 may be scanned multiple times by different DTs 200 during transport, a reviewer can quickly use UI 1000 to quickly scroll through each set of dimensioning information collected for freight 102 during transport. If any damage has occurred, for example, the reviewer can more easily pinpoint the time frame of the damage by noting the first set of images or 3D model showing the damage.

The system may also comprise programming that compares successive 3D models for each piece of freight 102. If there are any notable changes in the outer dimensions, there is a high likelihood that part of freight 102 has gone missing or that damage has occurred. The system can automatically alert personnel to these changes during the loading process because this comparison happens immediately after freight 102 is scanned by DT 200 during loading. An alert can be sent to the forklift operator or other personnel that a discrepancy exists in the dimensioning. The freight 102 can then be removed for a manual inspection to determine why any discrepancy exists in the collected dimensioning information.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A dimensioner table comprising:
an outer frame;
a plurality of cameras,
   wherein a camera is coupled to each corner of the outer frame, and
   wherein each of the plurality of cameras has a field of view that overlaps with at least one camera of the plurality of cameras; and
a coupling coupled to an outer edge of each corner of the outer frame,
   wherein the coupling releasably couples and mates the dimensioner table to a plurality of vertical posts,
   wherein each coupling is received within a corresponding opening within each vertical post of the plurality of vertical posts.

2. The dimensioner table according to claim 1, further comprising:
a pair of cross beams arranged in an X-shape coupled to each corner of the outer frame.

3. The dimensioner table according to claim 2, further comprising:
a pair of channels through the outer frame and the pair of cross beams for accommodating tines of a fork lift.

4. The dimensioner table according to claim 1, further comprising:
at least one power supply for powering the plurality of cameras; and
a radio frequency identification (RFID) scanner or a barcode scanner.

5. The dimensioner table according to claim 1, wherein the field of view of each camera overlaps with a field of view of each of the plurality of cameras.

6. The dimensioner table according to claim 1, further comprising:
an inner frame coupled to the outer frame by a pair of cross beams.

7. A dimensioner table system comprising:
a mobile platform;
a plurality of posts coupled to an outer edge of the mobile platform;
a dimensioner table coupled to a top of four posts of the plurality of posts, wherein the dimensioner table comprises:
   a camera mounted to each corner of the dimensioner table,
   wherein an optical center of the cameras converge at a central point at or above a surface of the mobile platform.

8. The dimensioner table system according to claim 7, wherein the mobile platform is approximately a same size as a trailer of a semi-trailer truck.

9. The dimensioner table system according to claim 7, further comprising:

a wireless transmitter coupled to the cameras for transmitting photos of cargo placed under the dimensioner table to a central database.

10. A dimensioner table comprising:
an outer frame;
a plurality of cameras,
wherein a camera is coupled to each corner of the outer frame, and
wherein each of the plurality of cameras has a field of view that overlaps with at least one camera of the plurality of cameras; and
a pair of cross beams arranged in an X-shape coupled to each corner of the outer frame.

11. The dimensioner table according to claim 1, further comprising:
a locking mechanism for releasably securing at least one coupling from at least one vertical post of the plurality of vertical posts.

\* \* \* \* \*